United States Patent [19]
Andrus et al.

[11] Patent Number: 5,298,332
[45] Date of Patent: Mar. 29, 1994

[54] GLASS-CERAMIC COATINGS FOR TITANIUM-BASED METAL SURFACES

[75] Inventors: Ronald L. Andrus, Elmira; John F. MacDowell, Penn Yan, both of N.Y.

[73] Assignee: Corning Incorporated, Corning, N.Y.

[21] Appl. No.: 792,646

[22] Filed: Nov. 15, 1991

Related U.S. Application Data

[63] Continuation-in-part of Ser. No. 409,506, Aug. 21, 1989, abandoned.

[51] Int. Cl.$^5$ .......................... B32B 15/04; B05D 3/02
[52] U.S. Cl. ..................................... 428/469; 428/472; 428/432; 427/397.8
[58] Field of Search ............... 428/432, 469, 471, 472, 428/472.1; 427/397.8

[56] References Cited

U.S. PATENT DOCUMENTS

| | | | |
|---|---|---|---|
| 3,397,076 | 8/1968 | Little et al. | 117/70 |
| 3,467,534 | 9/1969 | MacDowell | 106/39 |
| 3,531,303 | 9/1970 | Bahat | 106/39 |
| 3,578,470 | 5/1971 | Bahat et al. | 106/39 |
| 3,837,978 | 9/1974 | Busdiecker et al. | 161/1 |
| 3,969,195 | 7/1976 | Dotzer et al. | 204/422 |
| 4,256,796 | 3/1981 | Hang et al. | 428/210 |
| 4,385,127 | 5/1983 | Chyung | 501/5 |
| 4,485,151 | 11/1984 | Stecura | 428/633 |
| 4,535,033 | 8/1985 | Stecura | 428/633 |
| 4,861,734 | 8/1989 | MacDowell | 501/10 |
| 4,892,693 | 1/1990 | Perrotta et al. | 427/203 |
| 4,917,858 | 4/1990 | Eglon et al. | 419/28 |
| 4,917,941 | 4/1990 | Hillig et al. | 428/283 |
| 4,941,928 | 7/1990 | Ammon et al. | 427/422 |
| 5,118,581 | 6/1992 | Shalaby | 428/433 |
| 5,153,070 | 10/1992 | Andrus et al. | 428/408 |

Primary Examiner—Peter A. Nelson
Attorney, Agent, or Firm—K. van der Sterre

[57] ABSTRACT

An article of manufacture comprising protectively coated titanium, titanium alloy or titanium aluminide, and a method for making it, wherein the protective coating is an adherent crystalline alkaline earth silicate glass-ceramic coating having a composition consisting essentially, in weight percent on the oxide basis, of about 20-75% total of oxides selected in amounts not exceeding the indicated proportions from the group consisting of up to about 50% BaO, 55% SrO, and 35% CaO, 25-60% of $SiO_2$ and, as optional constituents, 0-25% MnO, 0-20% MgO, and 0-30% total of other compatible bivalent and trivalent metal oxides. The coating is applied as a continuous glassy coating and is converted to a crystalline glass-ceramic coating by heat treatment.

5 Claims, No Drawings

GLASS-CERAMIC COATINGS FOR TITANIUM-BASED METAL SURFACES

This application is a continuation-in-part of prior application Ser. No. 07/409,506, filed Aug. 21, 1989 and now abandoned.

This invention relates to glass compositions for providing protective coatings on titanium-based metal substrates and more particularly to coated articles composed of or comprising a substrate portion formed of titanium, titanium aluminide or titanium alloy and a coating on the substrate which is a barium silicate or strontium silicate glass-ceramic coating. The coating serves as a chemical barrier against oxidation or other deterioration of the substrate by corrosive agents in the environment, as well as a thermal barrier to prevent rapid heatup of the substrate.

A recently developed series of titanium aluminide intermetallic compounds offers a unique combination of low density, high strength, and sustained resistance to temperatures up to 1000° C. These compounds are being considered for use in airframes, engines, and other components for advanced ultrasonic aircraft such as the national aerospace plane (NASP), where multiple exits from and entries into the earth's atmosphere will be required. This application will require very high resistance to oxidation and, in at least some cases, high resistance to hydrogen attack over a broad temperature regime.

However, two aluminide candidate materials presently being evaluated, i.e., titanium aluminide in the gamma form (TiAl) and in the super $\alpha$-2 form ($Ti_3Al$) are both susceptible to oxidation attack, as well as to hydrogen embrittlement at elevated temperatures. Therefore, protective coatings will be required before these lightweight intermetallic compounds can be broadly utilized for space-age aircraft.

A common method of protecting materials from oxidation at elevated temperatures is to apply a continuous monolithic glass coating. This completely encapsulates and isolates the material from the surrounding atmosphere; however, viscous flow of the glass coating may occur when large surface stresses develop during high temperature use. In that case, a glass barrier coating tends to develop thin spots and fails catastrophically.

The high temperature viscosity of the glass coatings may be increased by mixing crystalline materials with the glass frits before application of the coating. However, these glass-crystalline mixtures sinter rather non-uniformly, the crystal size and homogeneity being very difficult to control. Certain portions of the substrate, therefore, tend to be entirely free from crystals, whereas other portions have too many (or too large) crystals to sinter well. A void-free coating with this heterogeneous glass-crystal mixture is thus difficult to obtain.

Polycrystalline ceramic coatings have been proposed as a way to protect superalloy materials from oxidative deterioration. Thus U.S. Pat. Nos. 4,485,151 and 4,535,033 (Stecura) describe the application of insulating layers of stabilized $ZrO_2$ to such materials via a plasma-spraying technique.

Such procedures involve several steps that are tedious and difficult to control in commercial production. Further, thermal gradients tend to develop during plasma-spraying and introduce defects in the finished coating. Also, the coatings tend to be porous. This permits access of gases, in particular $O_2$, $H_2$, $SO_2$, and water vapor, all of which can contribute to coating failure.

Glass-ceramics per se are of course well known and a wide variety of glass-ceramic compositions for various uses has been developed. U.S. Pat. No. 3,397,076 (Little et al.), for example, describes fused crystallizable ground and cover coats for high temperature alloys in which the major elements are cobalt, nickel, chromium, iron or mixtures. The ground coat is lithium-free and contains 35–65% $SiO_2$ and 12–45% BaO. Examples also contain substantial amounts of $R_2O$, $B_2O_3$ and/or $TiO_2$.

U.S. Pat. No. 3,467,534 (MacDowell) discloses glass-ceramic articles consisting essentially of 20–70% BaO and 30–80% $SiO_2$ and having a barium silicate principal crystal phase. A preferred example is described as considered for coating metals. U.S. Pat. No. 3,531,303 (Bahat) discloses glass-ceramic articles in the alkaline earth aluminosilicate field wherein a hexagonal alkaline earth feldspar or a triclinic form is the principal crystal phase. The materials are highly refractory with service temperatures up to 1700° C. and consist essentially of 12–53% $SiO_2$, 17–55% RO where RO is 17–50% SrO and 20–50% BaO, 10–58% $Al_2O_3$ and a nucleating agent.

U.S. Pat. No. 3,578,470 (Bahat) discloses glass-ceramic materials in the $BaO-Al_2O_3-SiO_2$ composition field nucleated with $Ta_2O_5$ and/or $Nb_2O_5$ that are especially suited to sealing with tungsten or molybdenum and their alloys, while U.S. Pat. No. 3,837,978 (Busdiecker) discloses barium aluminosilicate glass-ceramics nucleated by tin oxide, having a hexacelsian primary crystal phase, and having a coefficient of thermal expansion in the range of $50-170 \times 10^{-7}/°$ C.

Notwithstanding the fact that both glass-ceramic and coating technologies are highly developed, there remains a need for new protective coating formulations which could protect titanium, titanium alloys and titanium aluminide compounds from oxidation and other deterioration at high temperatures. It is accordingly a principal object of the present invention to provide a reliable and reproducible oxygen barrier coating for titanium, titanium alloy and titanium aluminide bodies or components that are required to operate at elevated temperatures.

Another object is to provide such a coating that is more effective, and easier to apply, than previously known coatings.

A further object is to provide a protective coating for titanium alloys and titanium aluminides that is non-porous, continuous and free from defects such as pinholes and cracks, and thus a barrier to the diffusion of oxygen as well as hydrogen and other corrosive gases.

A still further object is to provide a barrier coating that adheres tightly and resists spalling during thermal cycling.

Another object is to provide an oxygen barrier coating material that exhibits the excellent flow characteristics of a glass coating as it is fired in one temperature range, and becomes resistant to flow (due to crystallization) as it is heated in a higher temperature range.

A further object is to provide a titanium alloy or aluminide substrate or article supporting a glass-ceramic barrier coating that adapts the substrate to very high operating temperatures.

A still further object is to provide a useful degree of thermal insulation to titanium, titanium alloy, or titanium aluminide surfaces.

SUMMARY OF THE INVENTION

One difficulty associated with the application of protective coatings to titanium aluminide substrates relates to the fact that surface oxidation of these substrates prior to or during coating application must be taken into account. The resulting $TiO_2$-$Al_2O_3$ surface oxidation products provide a surface having a lower thermal expansion coefficient than that of superalloy surfaces comprising one or more of the oxides of nickel, cobalt, or iron.

The present invention provides a method for protecting titanium aluminide surfaces from oxidation or other attack by the application of one of a family of alkaline earth silicate glass-ceramic coating compositions thereto. These compositions provide excellent flow, crystallization and compatible bonding characteristics as applied to titanium aluminide substrates. Similar characteristics are imparted through application of the glass-ceramic coating compositions to titanium and titanium alloy substrates. The coating compositions are characterized alkaline earth silicates wherein barium, strontium and/or calcium constitute the alkaline earth oxides.

More particularly, the coatings have compositions consisting essentially, in weight percent on the oxide basis, of about 20–75% total of oxides selected in amounts not exceeding the indicated proportions from the group consisting of up to about 50% BaO, 55% SrO, and 35% CaO, 25–60% of $SiO_2$ and, as optional constituents, 0–25% MnO, 0–20% MgO, and 0–30% total of other compatible bivalent and trivalent metal oxides. To apply the coatings, glasses of the specified composition are applied to a titanium aluminide or titanium alloy surface to provide a continuous glassy coating thereon, and the coating is then crystallized by heat treatment to provide an adherent, densely crystalline glass-ceramic protective coating.

The invention further resides in a coated article or substrate formed of a metal selected from the group consisting of titanium, titanium alloys and titanium aluminides, wherein the metal is protected from oxidation and other types of corrosion by an adherent crystalline alkaline earth silicate glass-ceramic coating having a composition as above described. Through the use of these protective glass-ceramic coatings the article may be adapted to operate safely at temperatures up to 1000° C. in an oxygen-containing environments. Recent data suggest good resistance to hydrogen diffusion as well.

DETAILED DESCRIPTION

The coating compositions of the invention exhibit excellent flow and adherence to titanium aluminide surfaces during firing in air or other suitable atmospheres at temperatures above the softening point of the glass. Typical firing temperatures are in the range of 800–1100° C. No spalling due to thermal expansion mismatch or other incompatibility with the titanium aluminide substrate is observed upon cooling the fired coating.

A key feature provided by the coatings of the invention is that of achieving an appropriate balance between adequate viscous flow of the glass during the early firing stages and dense crystallization of the coating prior to completion of the firing cycle. Premature crystallization results in insufficient flow and a rough, porous coating.

Surprisingly, the achievement of adequate flow and adherence characteristics in these coatings does not require the use of crystallization retardants such as $Al_2O_3$ and $ZrO_2$. Such additives may be present if desired, but coatings of equivalent or superior quality may be achieved, particularly on $Ti_3Al$ substrates, in compositions free of these additives.

As is known, ceramics having a high expansion coefficient commonly contain rather large quantities of alkali oxides ($Li_2O$, $Na_2O$, or $K_2O$). However, these alkali ions are extremely mobile in most ceramic structures at high temperatures, and readily exchange for other ions. Therefore, they must be eliminated as major constituents in coatings that must continually operate at high temperatures.

Small additions, generally less than 5 mole percent, of other glass-modifying oxides, such as $CeO_2$, $TiO_2$, $Nb_2O_5$ and $B_2O_3$, can in some cases improve the flow and appearance of the coatings. Mixed barium magnesium and calcium magnesium silicate coatings comprising $B_2O_3$ are known, for example from U.S. Pat. Nos. 4,256,796, 4,358,541 and 4,385,127. However, the presence of a residual glassy or crystalline phase comprising this oxide tends to allow the crystals in the microstructure to move and flow at temperatures much below the solidus of the primary refractory silicate phases. Accordingly, the present coatings are most preferably formulated with little or no boric oxide.

The transition metal oxides FeO (or $Fe_2O_3$) and MnO, as well as the alkaline earth oxide MgO, appear to be effective in some of these composition systems in promoting a continuous, well-flowed glass coating prior to crystallization without unduly reducing the refractoriness of the coatings. These therefore constitute the preferred optional oxide additives for the protective coating of titanium aluminide substrates.

Based on the foregoing considerations, a preferred family of alkaline earth silicate glass-ceramic coating formulations has been identified. In these compositions, the optional additives to the (BaO, SrO, CaO)-$SiO_2$ base compositions are selected in the indicated proportions from the group consisting of 0–25% MnO, 0–25% FeO, 0–20% MgO, 0–10% $ZrO_2$, 0–10 $Al_2O_3$ and up to 35% total of MnO+FeO+MgO+$ZrO_2$+$Al_2O_3$.

The glass-ceramic compositions of the invention are most conveniently applied to titanium aluminide surfaces in the form of fine glass powders. Typically, the glasses are melted and converted from the melt into granular glass by drigaging or the like, and are then milled to provide fine glass powder. The particle sizes of the milled glass are typically in the 5–20 micron range, although smaller particle sizes may be preferred where very thin coatings are required.

The surface of a selected titanium aluminide body or body comprising a titanium aluminide surface may be coated with the powdered glass in any conventional manner. The method we prefer is electrostatic spraying, wherein electrostatically-charged, dry glass powder is very uniformly sprayed onto the aluminide body, which is supported on an oppositely charged wire mesh screen. Alternatively, the powdered glass may be mixed with a suitable medium, e.g., water or an organic vehicle, applied uniformly over the glass surface and dried.

The glass powder-coated aluminide body is then heated to a temperature of 800–1100° C. This softens the glass particles and produces a dense, smooth, well-formed continuous glass coating that is essentially free from crystallization. The glass-coated body is then heated for a longer time or to a somewhat higher temperature. This completes the development of crystal phases to form a dense, strong, refractory, crystalline coating.

The invention is further illustrated in Table I below by specific examples of glass-ceramic compositions that may be applied as coatings to titanium aluminide bodies in accordance with the invention. Properly applied, these materials yield smooth, adherent, non-porous coatings that have little or no tendency to spall during temperature cycling.

To prepare coating material from these compositions, glass batches of corresponding composition are mixed and melted in platinum crucibles at 1600–1650° C. for two hours. The glass melts thus obtained are then poured into water to quench and granulate the glass. The granular glass (drigage) is thereafter ball milled with alumina cylinders for 4 to 8 hours to provide powdered glass with an average particle size of about 10 micrometers.

TABLE I

| Coating Compositions | | | | | | | | | |
|---|---|---|---|---|---|---|---|---|---|
| | 1 | 2 | 3 | 4 | 5 | 6 | 7 | 8 | 9 |
| $SiO_2$ | 36.4 | 34.9 | 32.5 | 31.9 | 32.0 | 34.8 | 33.3 | 29.8 | 29.4 |
| BaO | 46.5 | 44.5 | 41.5 | 40.8 | 40.9 | 44.5 | 42.6 | 38.1 | 37.6 |
| SrO | — | — | — | — | — | — | — | 25.7 | 25.4 |
| CaO | 17.0 | — | — | — | — | — | 15.6 | — | — |
| MnO | — | 20.6 | 19.2 | — | 18.9 | — | — | — | — |
| FeO | — | — | — | 19.1 | — | — | — | — | — |
| MgO | — | — | — | — | — | 11.7 | — | — | — |
| $Al_2O_3$ | — | — | 6.9 | — | — | — | — | 6.3 | — |
| $ZrO_2$ | — | — | — | 8.2 | 8.2 | 8.9 | 8.6 | — | 7.6 |

| | 10 | 11 | 12 | 13 | 14 | 15 | 16 | 17 |
|---|---|---|---|---|---|---|---|---|
| $SiO_2$ | 36.9 | 33.9 | 41.7 | 38.6 | 54.2 | 46.2 | 40.4 | 45.5 |
| BaO | 31.8 | 43.3 | 42.7 | — | — | 39.4 | 34.4 | — |
| SrO | — | — | — | 50.0 | — | — | — | 26.2 |
| CaO | — | — | 15.6 | — | 22.5 | 14.4 | 25.2 | 28.3 |
| MnO | 21.7 | 20.0 | — | 11.4 | 7.1 | — | — | — |
| MgO | — | — | — | — | 16.2 | — | — | — |
| $Al_2O_3$ | — | 2.9 | — | — | — | — | — | — |
| $ZrO_2$ | 9.5 | — | — | — | — | — | — | — |

To characterize the crystallization behavior of the above compositions, powdered glasses produced as described are dry-pressed into cylinders ½" in diameter. These are then heat treated at temperatures of 800–1200° C. for ½–1 hour to determine the sintering characteristics and density (porosity) of the compositions. Additionally, 4"×¼"×¼"bars are pressed and fired to determine the thermal expansion coefficients of the crystalline materials.

In some cases X-ray diffraction analyses are conducted on fired samples to determine crystal phases developed during firing. In general these analyses reveal complex patterns of calcium, strontium, and barium silicates, substantially modified in some cases by the addition of other oxides. Specific examples of major crystal phases which have been identified include $Ba_{1.5}Ca_{.45}SiO_4$, $BaSrSi_3O_8$, $BaMg_2Si_2O_7$ and $Ca_2BaSi_3O_9$ (Walstromite).

Coatings of the compositions thus evaluated are next applied to titanium aluminide substrates to confirm the compatibility of the glass and glass-ceramic materials therewith. The coatings are applied in thicknesses between 20 and 100 micrometers to $Ti_3Al$ coupons of 2 mm thickness using electrostatic spraying. The surfaces of the coupons are cleaned and grit-blasted prior to coating. Each glass-coated coupon is then fired to a temperature of 1000° C. for one hour, using a furnace heating rate of approximately 75° C. per minute. Although both air and helium atmospheres are used during firing and appear to yield excellent coatings, air is preferred because of its appreciably lower cost.

Illustrative results from evaluations such as described above are reported in Table II below. The example numbers of Tables I and II correspond for cross reference. Included in Table II for each of the Table I compositions are density and thermal coefficient of expansion (TCE) data as determined on pressed crystallized samples, as well as a description of the appearance of coatings of the crystallized glass-ceramics as applied to $Ti_3Al$ substrates.

As the coating descriptions indicate, small seed and pinhole defects are observed in some of the coatings, particularly if very thin, and minor edge spalling is observed in one case. However, it is anticipated that fine tuning of the processing will readily avoid these minor conditions.

TABLE II

| | Coating Properties | | |
|---|---|---|---|
| Example | Density (g/cc) | TCE ($\times 10^7$ °C.) | Coating Description ($Ti_3Al$ Substrate) |
| 1 | 3.234 | 129.3 | grey translucent |
| 2 | 3.243 | 141.1 | finely textured grey |
| 3 | 3.257 | 65.4 | opaque brown/silver grey surface |
| 4 | 3.313 | 97.7 | smooth glossy brown/few pinholes |
| 5 | 3.345 | 115.2 | wrinkled "metallic" vio.-grey |
| 6 | 3.744 | 96.0 | slt. rippled transparent |
| 7 | 3.158 | 49.8 | transparent smooth, seeds and pinholes |
| 8 | 3.472 | 94.1 | grey translucent, pinholes |
| 9 | 3.535 | 97.9 | clear transparent, v. fine seed |
| 10 | 3.081 | 117.7 | textured black |
| 11 | 3.218 | 80.6 | grey surface crystals on dk. brown coating |
| 12 | 3.562 | 111.9 | pinholes, blistered translucent grey-brown |
| 13 | 2.963 | 103.9 | textured glossy red-brown |
| 14 | 2.971 | 89.0 | translucent grey/some seed, pinholes |
| 15 | 3.277 | 84.0 | smooth translucent, some seed and edge spalling |
| 16 | 3.496 | 99.7 | lt. grey brown, some pinholes, v.f. surface cracks |
| 17 | 3.071 | 111.6 | translucent grey, pinholes, fine surface cracks |

Unexpectedly, scanning electron micrographs of selected coatings from Table II indicate that, in most cases, no oxide interface is present between the $Ti_3Al$ substrate and the glass-ceramic coating. This is in contrast with the appearance of uncoated air-fired $Ti_3Al$ which, under the firing conditions used to apply these protective coatings, develops a loose oxide layer of 5 to 10 $\mu m$ thickness.

The absence of an oxidation layer is presently attributed to the dissolution of surface $TiO_2$ and $Al_2O_3$ by-products of titanium aluminide oxidation by the glass during firing. Thus in addition to providing excellent oxidation protection, anticipated to be equivalent to that afforded to superalloy substrates by certain of these coatings, the use of a helium atmosphere during coating application is not required. Good coating adherence even to partially oxidized surfaces can apparently be achieved. Of course, the final coating would be expected to show significant increases in $TiO_2$ and $Al_2O_3$ content in the interfacial region as dissolution of surface oxides occurs, but there is no evidence that this effect is harmful to the adherence and other properties of the coating.

As expected, equivalent coating properties for these compositions are observed when a gamma-titanium aluminide (TiAl) rather than a Ti$_3$Al substrate is treated. Table III below reports coating results for selected compositions from Table I as applied to TiAl coupons following the coating procedure described above.

TABLE III

| Example | TCE ($\times 10^7$ °C.) | Coating Properties Coating Description (TiAl Substrate) |
|---|---|---|
| 1 | 129.3 | translucent, hazy, porous, adherent, no spalling, but too thin |
| 3 | 65.4 | smooth, dark, transparent, adherent, no spalling; seeds, pinholes where too thin |
| 8 | 94.1 | dark, transparent, smooth, adherent, no spalling |
| 10 | 117.7 | dark, translucent, smooth, adherent, no spalling, pinholes from seed blisters |
| 14 | 89.0 | porous, translucent, grey, adherent, no spalling, discontinuous |
| 15 | 84.0 | porous, dark, translucent grey, adherent, no spalling, discontinuous |

These results, in combination with similar results for other coating compositions applied to TiAl within the scope of the invention, have demonstrated complete freedom from spalling and therefore good physical and chemical compatibility with these substrates. Again, minor coating continuity difficulties including pinholes may be corrected with thicker coatings and/or routine process modifications.

The use of the glass-ceramic coating compositions of the invention to provide protective coatings of high quality on titanium and titanium alloy substrates provides similar levels of substrate protection. Of course, in contrast to the titanium aluminides, which are based largely on the titanium intermetallic compounds Ti$_3$Al and/or TiAl and consist predominantly of titanium and aluminum, the commercial titanium alloys contain mostly titanium metal with only minor additions of other elements. Nevertheless, good adherence and coating quality are obtained with these substrates as well.

Representative commercial titanium alloy compositions which may be provided with glass-ceramic coatings in accordance with the invention are set out in Table IV below. The proportions of titanium and alloying elements making up each of the alloys shown are reported in parts by weight.

TABLE IV

| Alloy | Ti | Al | Nb | V | Mo | Sn | Zr | Cr |
|---|---|---|---|---|---|---|---|---|
| Ti-6-4 | 90 | 6 | — | 4 | — | — | — | — |
| Ti-6-2-4-2 | 86 | 6 | — | — | 2 | 2 | 4 | — |
| Ti-8-1-1 | 90 | 8 | — | 1 | 1 | — | — | — |
| Ti-5-2.5 | 92.5 | 5 | — | — | — | 2.5 | — | — |
| Ti-6-6-2 | 86 | 6 | — | 6 | — | 2 | — | — |
| Ti-6-2-4-6 | 82 | 6 | — | — | 6 | 2 | 4 | — |
| Ti-15-3-3-3 | 76 | 3 | — | 15 | — | 3 | — | 3 |
| Ti-13-11-3 | 73 | 3 | — | 13 | — | — | — | 11 |
| Ti-3-8-6-4-4 | 75 | 3 | — | 8 | 4 | — | 4 | 6 |
| Ti-10-2-3 | 85 | 3 | — | 10 | — | — | — | (2Fe) |

An illustrative procedure for applying a protective glass-ceramic coating to a typical titanium alloy substrate is as follows. A sample of the alloy designated as Ti-6-4 alloy in Table IV above, consisting of about 6 weight percent Al, 4 weight percent V, and the balance Ti, is selected for coating. A powdered glass for a glass-ceramic coating is then selected, the glass selected having a composition, in weight percent, of about 38.3% SiO$_2$, 33.1% SrO, 5.9% ZrO$_2$, and 22.7% MnO. A powder of this glass is prepared by crushing glass ribbon of the selected composition and then grinding the crushed glass to reduce the average particle size to about 8 μm.

A sample of the titanium Ti-6-4 alloy is next prepared for coating by grit-blasting with 220 grit alumina. Thereafter the sample is washed in soapy water, rinsed in distilled water, air-dried at 110° C., and cooled to room temperature. The sample is next coated with the powdered glass, using a two-step coating procedure to insure good substrate coverage. A slurry of the glass powder is first prepared and applied to the sample by dipping. The slurry consists of about 40 grams of glass powder and 60 ml of ethyl acetate. After air-drying, the dried slurry coating is then overcoated with an additional coating of the same slurry, this overcoating being applied by electrostatic spraying in accordance with known practice.

The coated sample thus provided is next heat-treated to sinter and crystallize the powdered glass coating. Heat treatment comprises firing the sample in a helium-rich atmosphere at 850° C. for one hour. Post-heat-treatment examination of the sample shows good coating flow and full crystallization of the glass, with excellent adherence of the coating to the alloy substrate.

The coated titanium alloy sample thus provided is tested for oxidation resistance, along with an uncoated alloy sample, using a cyclic thermal oxidation test. Multiple thermal cycles are used, each cycle comprising plunging the sample into a 650° C. furnace (air atmosphere) for 65 minutes, following by sample removal and a 45 minute interval in air at room temperature.

The results of this test demonstrate excellent oxidation resistance in the coated sample. While the uncoated titanium alloy sample showed a weight gain of over 0.9 mg/cm2 due to oxygen pick-up through only 48 thermal oxidation cycles, the sample provided with the glass-ceramic coating gained less than 0.08 mg/cm2 through 821 such cycles. Most importantly, the glass-ceramic coating on the thermally cycled sample exhibited no change in appearance, and remained well-adhered to the titanium alloy substrate.

While the invention has been particularly described above with respect to specific materials and specific procedures, it will be recognized that those materials and procedures are presented for purposes of illustration only and are not intended to be limiting. Thus numerous modifications and variations upon the compositions and processes specifically described herein may be resorted to by those skilled in the art within the scope of the appended claims.

We claim:

1. A method for protecting a substrate formed of a metal selected from the group consisting of titanium, titanium aluminides and titanium alloys from oxidation and chemical attack which comprises the steps of:
    applying to a surface of the substrate a continuous glassy coating of an alkaline earth silicate glass having a composition consisting essentially, in weight percent on the oxide basis, of about 20–75% total of oxides selected in amounts not exceeding the indicated proportions from the group consisting of up to about 50% BaO, 55% SrO, and 35% CaO, 25–60% of SiO$_2$ and, as optional constituents, 0-25% MnO, 0-20% MgO, and 0-30% total of other compatible bivalent and trivalent metal oxides; and crystallizing the continuous glassy coating by heat treatment to provide an adherent, densely crystalline glass-ceramic coating on the substrate surface.

2. A method in accordance with claim 1 wherein the substrate is a titanium aluminide and wherein the optional constituents in the alkaline earth silicate glass are selected in the indicated proportions from the group consisting of 0-25% MnO, 0-25% FeO, 0-20% MgO, 0-10% $ZrO_2$, 0-10 $Al_2O_3$ and up to 35% total of MnO+FeO+MgO+$ZrO_2$+$Al_2O_3$.

3. A coated article composed of a metal selected from the group consisting of titanium, titanium aluminides and titanium alloys wherein the metal is protected from oxidation by an adherent crystalline alkaline earth silicate glass-ceramic coating having a composition consisting essentially, in weight percent on the oxide basis, of about 20-75% total of oxides selected in amounts not exceeding the indicated proportions from the group consisting of up to about 50% BaO, 55% SrO, and 35% CaO, 25-60% of $SiO_2$ and, as optional constituents, 0-25% MnO, 0-20% MgO, and 0-30% total of other compatible bivalent and trivalent metal oxides.

4. A coated article in accordance with claim 3 which is composed of titanium aluminide and wherein the optional constituents present in the crystalline alkaline earth aluminosilicate glass-ceramic coating are selected in the indicated proportions from the group consisting of 0-25% MnO, 0-25% FeO, 0-20% MgO, 0-10% $ZrO_2$, 0-10 $Al_2O_3$ and up to 35% total of MnO+FeO+MgO+$ZrO_2$+$Al_2O_3$.

5. A coated article in accordance with claim 4 which is resistant to oxidation at temperatures up to 1000° C. in an oxygen-containing environment.

* * * * *